United States Patent [19]
Radko et al.

[11] Patent Number: 5,675,833
[45] Date of Patent: Oct. 7, 1997

[54] APPARATUS AND METHOD FOR DETECTING INSERTIONS AND REMOVALS OF FLOPPY DISKS BY MONITORING WRITE-PROTECT SIGNAL

[75] Inventors: Ronald O. Radko; Michael Toutonghi, both of Bellevue, Wash.

[73] Assignee: Microsoft Corporation, Redmond, Wash.

[21] Appl. No.: 474,315

[22] Filed: Jun. 7, 1995

Related U.S. Application Data

[63] Continuation of Ser. No. 354,917, Dec. 13, 1994, abandoned, which is a continuation-in-part of Ser. No. 268,015, Jun. 29, 1994, Pat. No. 5,625,799.
[51] Int. Cl.⁶ .................................................. G06F 11/30
[52] U.S. Cl. ........................ 395/837; 395/838; 360/69
[58] Field of Search ........................... 395/838, 835, 395/837, 839; 360/99.02, 99.06, 69, 71

[56] References Cited

U.S. PATENT DOCUMENTS

| | | | |
|---|---|---|---|
| 4,665,445 | 5/1987 | Saito | 360/71 |
| 5,173,816 | 12/1992 | Ogihara | 360/69 |
| 5,239,426 | 8/1993 | Sakaegi | 360/69 |
| 5,293,625 | 3/1994 | Miura et al. | 395/500 |
| 5,301,293 | 4/1994 | Kano | 395/425 |
| 5,548,784 | 8/1996 | Easley, Jr. et al. | 395/838 |

OTHER PUBLICATIONS

*IBM Technical Reference, Personal Computer AT System BIOS 5*, ROM BIOS Code Listing for Floppy Controller, IBM, 1985, pp. 97–116.

*Primary Examiner*—Thomas C. Lee
*Assistant Examiner*—D. Dinh
*Attorney, Agent, or Firm*—Seed and Berry LLP

[57] ABSTRACT

A method and system for determining insertions and removals of floppy disks in a floppy disk drive. By monitoring states of a write protect signal, the present invention determines when floppy disks of a predetermined type are inserted into, and removed from, a floppy disk drive. More specifically, the present invention evaluates current states of the write protect signal in light of a default state of the write protect signal to determine when these floppy disks are inserted into, and removed from, the floppy disk drive.

27 Claims, 5 Drawing Sheets

APPARATUS AND METHOD FOR DETECTING INSERTIONS AND REMOVALS OF FLOPPY DISKS BY MONITORING WRITE-PROTECT SIGNAL

CROSS-REFERENCE TO RELATED APPLICATION

The present application is a continuation of United States application entitled "Method And Apparatus For Detecting Insertions And Removals Of Floppy Disks In A Floppy Disk Drive," identified by Ser. No. 08/354,917, filed on Dec. 13, 1994, (now abandoned) which is a continuation-in-part of the U.S. application, entitled "Method And Apparatus For Determining The Logic And Functionality Of A Changeline," by inventor Ron Radko, Ser. No. 08/268,015, filed on Jun. 29, 1994 now U.S. Pat. No. 5,625,799, and assigned to a common assignee. This application is incorporated herein by reference.

TECHNICAL FIELD

The present invention relates to the field of computer systems and, more particularly, to a method and system for determining insertions and removals of floppy disks in a floppy disk drive.

BACKGROUND OF THE INVENTION

In personal computer systems, floppy disks provide an inexpensive and easily portable storage medium. In brief, floppy disks allow a user of a computer system to store and recall data (e.g., application programs and associated files) as needed. When the user desires to store or recall a particular piece of data to/from a floppy disk, the user simply inserts the desired disk into a floppy disk drive of a personal computer system and invokes an appropriate command from an application program (e.g., save file or open file command). As floppy disks are frequently swapped in and out of the floppy disk drive, it is desirable to provide a method and system that can notify application programs when floppy disks are removed from the floppy disk drive and when floppy disks are inserted in the floppy disk drive.

Effectuating prompt notification of such insertions and removals is difficult in machines that do not provide hardware support for determining insertions and removals of floppy disks. For example, machines adhering to the "IBM" standard architecture do not provide hardware support for determining insertions and removals of floppy disks. Instead, these machines provide only a signal known as a changeline. This changeline is activated by an opening of the floppy disk drive's door and is reset by powering the floppy disk drive's motor and repositioning the floppy disk drive's heads on the floppy disk. The practical use of this changeline is limited as an activated changeline does not indicate whether the floppy disk drive contains a floppy disk but instead only indicates whether the floppy drive's door has been opened since the last resetting of the changeline.

Conventional systems determine whether an activated changeline indicates an insertion or a removal of a floppy disk by attempting to reset the changeline. As a changeline can be reset only when a floppy disk is present in the floppy disk drive, conventional systems distinguish between floppy disk insertions and removals by monitoring the changeline to determine whether the reset attempt has been successful (i.e., to determine whether the resetting attempt returned the changeline to an inactive state). For example, if an attempt to reset an activated changeline is not successful, conventional systems determine that the activated changeline represents a floppy disk removal. Similarly, if an attempt to reset an activated changeline is successful, conventional systems determine that the activated changeline represents an insertion of a floppy disk, or, more particularly, a removal and an insertion of a floppy disk. Attempting to discern the meaning of an activated changeline by attempting to reset the changeline is flawed because this technique (1) requires powering the floppy drive's motor for an extended period of time, (2) requires repositioning the floppy disk drive's heads, and (3) causes the floppy disk drive's light (hereafter LED) to become illuminated. Each of these three aspects require extended powering of the floppy disk drive's components. Such extended powering is undesirable for three reasons. First, the extended powering drains a substantial amount of power from the computer system. This draining of power complicates power management timing strategies. The phrase "power management strategies" refers to a concept of allocating power between differing components of the computer system. In brief, power is allocated by dividing the use a total amount of power between the differing components of the computer system. The total amount of power available to a computer system at any one time is relatively constant as the computer system uses a constant voltage as its power source (e.g., a DC voltage). Consequently, when the power usage for one component increases, the remaining amount of power available to the other components and the complexity of the timing strategies is increase. The time and effort required to create and debug the timing strategies is directly proportional to their complexity. Accordingly, this complexity should be minimized whenever possible. Second, the extended powering represents an inefficient use of energy. This problem is particularly acute for battery-powered computer systems. For these types of systems, such extended powering quickly drains the computer system's battery and temporarily renders the system unusable. Third, the extended powering leads to premature fatigue of the floppy disk drive's components (e.g., the floppy disk drive's motor). For these reasons, the conventional technique for determining insertions and removals of floppy disks is inadequate.

SUMMARY OF THE INVENTION

The present invention is directed towards a facility for determining insertions and removals of floppy disks in a floppy disk drive. The facility, relative to conventional systems, helps to increase lifetimes of floppy disk drive components and simplifies a computer system's power management timing strategies. By evaluating states of a write protect signal, the facility detects when floppy disks of a predetermined type (e.g., a write protected type or a non-write protected type) are inserted into, and removed from, the floppy disk drive. More specifically, the facility determines such insertions and removals by evaluating a current state of the write protect signal in light of a default state of the write protect signal. For example, a first embodiment of the facility (1) determines whether the write protect signal's default state (i.e., the state of the write protect signal when disk drive is empty) indicates a write protect status or a non-write protect status, and (2) evaluates a current write protect signal's state to determine whether the floppy disk drive contains a floppy disk of the predetermined type. By monitoring the write protect signal for state changes, the first preferred embodiment can detect insertions and removals of disks of the predetermined type. In a second embodiment, the facility compares current and default states of the write protect signal to determine whether an activated changeline indicates an insertion or a removal of a floppy disk of the predetermined type.

The present invention is exceptionally useful for types of applications where prompt notification of floppy disk insertions and removals is particularly desirable. An autorun program (a program that is executed automatically upon detection) is an example of a type of application where prompt notification of insertions and removals is particularly pertinent. The desirability of prompt notification is acute during the developmental stage of the autorun program (e.g., the stage in which a software developer is debugging the autorun program). In this stage, the software developer is continuously updating and improving the autorun program. To test each updated and improved version of the autorun program, the developer inserts a floppy disk containing the autorun program into the floppy disk drive. Upon recognizing that the inserted floppy disk contains an autorun file, the operating system directs the central processing unit to execute the autorun file. The operation of Autorun Programs is described in more detail in the previously incorporated co-pending application entitled "Method and System for Automatically Running a Program." When prompt notification of the floppy disk insertion is not effectuated, the software developer is forced to manually inform the operating system that a floppy disk has been inserted (e.g., by directing the operating system to inspect the contents of the floppy disk drive). Manually informing the operating system of floppy disk insertions is inefficient and is frustrating for the software developer. Another example of a type of application where prompt notification of floppy disk insertions and removals is particularly pertinent is a file management application (e.g., "WINDOWS EXPLORER" by Microsoft Corporation, Redmond, Wash.). These types of applications maintain directories that list the files which are currently contained on a particular drive (e.g., the files of the floppy disk that is currently present in the floppy disk drive). For such application programs, prompt notification of floppy disk insertions and removals is essential to the proper maintenance of these drive directories. Accordingly, the present invention is markedly beneficial for use in computer systems using these two types of applications.

DETAILED DESCRIPTION OF THE INVENTION

Figure 1:
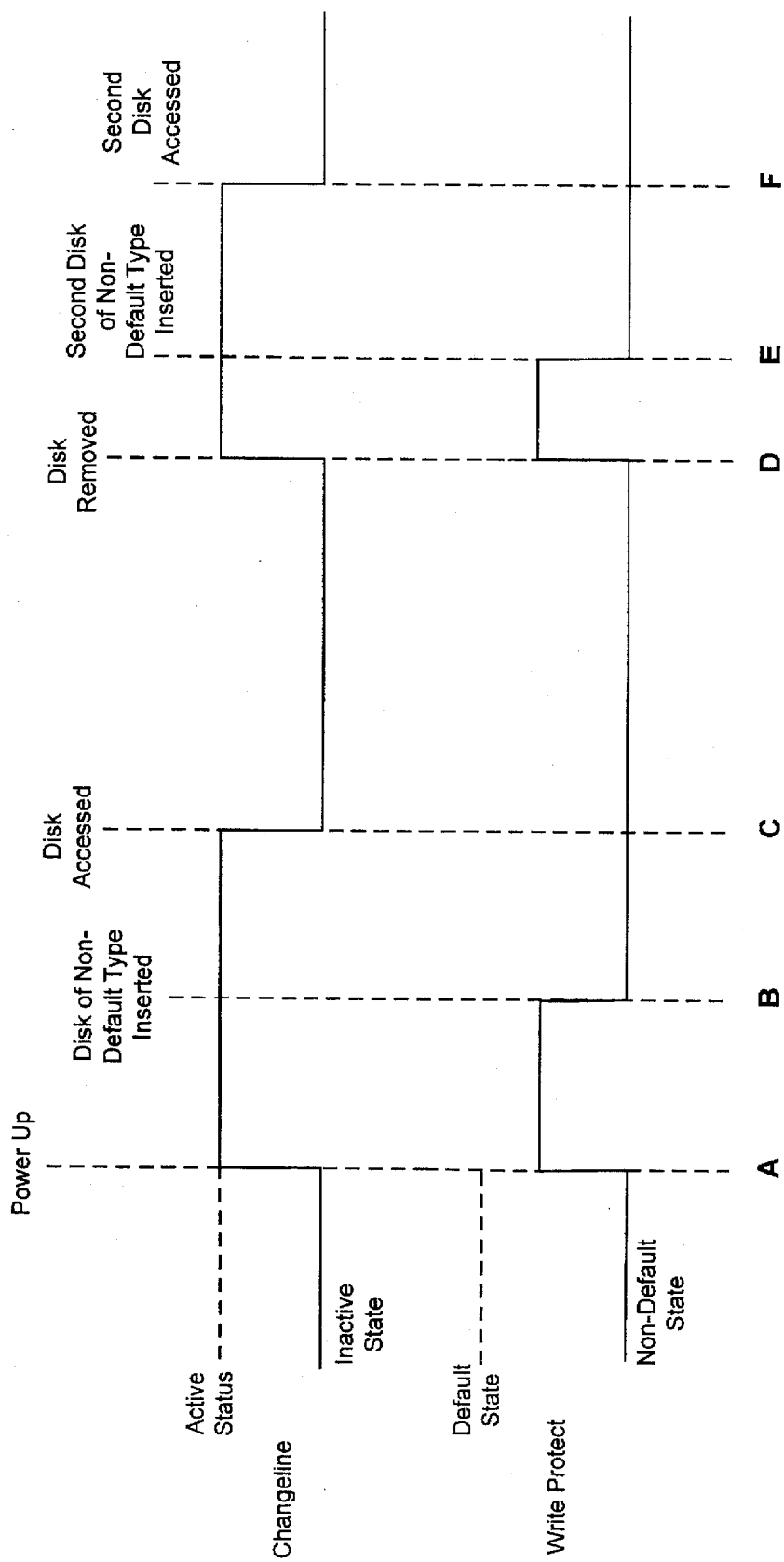
FIG. 1 is a diagram illustrating states of a changeline signal and a write protect signal as they are evaluated in a preferred embodiment of the present invention.

A preferred embodiment of the present invention is directed towards a facility for determining insertions and removals of floppy disks in a floppy disk drive. The facility utilizes a write protect signal to determine whether an activated changeline represents an insertion or a removal of a floppy disk. Utilizing the write protect signal as an aid in determining insertions and removals of floppy disks in the floppy disk drive represents a significant departure from techniques employed in conventional systems. More specifically, utilization of such a signal enables the present invention to evaluate the meaning of an activated changeline without (1) powering up the drive motor for extended periods of time, (2) repositioning the floppy drive's heads, or (3) illuminating the floppy disk drive's LED. As a result, the facility, relative to conventional systems, helps to increase floppy disk drive motor lifetimes and simplifies the computer system's power management timing strategies.

As mentioned above, the facility evaluates a write protect signal to determine whether an activated changeline represents an insertion or a removal of a floppy disk in the floppy disk drive. This write protect signal is provided in all machines that adhere to the "IBM" standard architecture. The write protect signal identifies whether a floppy disk contained in the floppy disk drive is or is not write protected. The floppy disk drive determines a floppy disk's write protect status by evaluating whether a notch (or a hole) in the disk's casing is or is not exposed. As the name implies, a non-write protected disk allows the user to read data from the disk and to write data onto the disk. Analogously, a write protected floppy disk allows the user to read data from the disk but prohibits the user from writing data onto the disk. When a disk is not contained in the floppy disk drive, the write protect signal defaults to a constant state (hereinafter "default state"). Depending on the manufacturer and model of particular floppy disk drives, this default state may indicate a write protect status or a non-write protect status. By (1) determining whether the write protect signal's default state indicates a write protect status or a non-write protect status, and (2) evaluating a current write protect signal's state upon observing an activated changeline, the facility determines whether the activated changeline represents an insertion or a removal of a floppy disk. As will be made apparent from the discussion below, when the write protect signal's default state indicates a write protect status, the present invention can detect insertions and removals of non-write protected floppy disks. Similarly, when the write protect signal's default state indicates a non-write protect status, the present invention can detect insertions and removals of write protected floppy disks. In summary, the present invention can detect insertions and removals of "non-default" types of floppy disks, where "non-default" refers to the type (i.e., write protected or non-write protected) of floppy disk that is not indicated by the default state of the write protect signal.

FIG. 1 is a diagram illustrating states of a changeline signal and a write protect signal. This diagram illustrates how the facility evaluates the states of these two signals to determine insertions and removals of disks of a non-default type. Assuming that a floppy disk is not present in the floppy disk drive on power-up, the write protect signal will be in its default state and the changeline signal will be in its active state (reference A). Upon insertion of a disk of the non-default type, the write protect signal is placed in a non-default state (reference B). However, the changeline remains in the active state as the changeline cannot detect the insertions of floppy disks. When the floppy disk is accessed, or an explicit attempt to reset the changeline is made, the changeline is placed in its inactive state (reference C). As soon as the disk is removed from the floppy disk drive, the changeline is placed in its active state and the write protect signal is placed in its default state (reference D). When a second disk of the non-default type is inserted into the floppy disk drive, the write protect signal is returned to its non-default state while the changeline remains in its active state (reference E). When this second disk is accessed, the changeline returns to its inactive state (reference F). These state changes are summarized below in Tables 1 and 2. Each table illustrates cases where the changeline utilizes a high-logic state (i.e., "1") to indicate an activated changeline. However, those skilled in the art will appreciate that the present invention is equally applicable to changelines that use a low-logic state (i.e., "0") to indicate an activated changeline. Table 1 illustrates the case where the write protect signal defaults to a write protect status where a high-logic state indicates write protect. Table 2 illustrates the case where the write protect signal defaults to a non-write protect status where a low-logic state indicates non-write protect.

TABLE 1

| Meaning | disk removed write protected disk inserted, prior to access | non-write protected disk inserted | no change, write protected disk in drive | no change, non-write protected disk in drive |
| --- | --- | --- | --- | --- |
| Changeline | 1 | 1 | 0 | 0 |
| Write Protect | 1 | 0 | 1 | 0 |

Chart Assuming that a High-Logic State (i.e., "1") Changeline Signal indicates an Active Changeline and that the Write Protect Signal Defaults to a Write Protect Status where a High-Logic state (i.e., "1") indicates Write Protect.

TABLE 2

| Meaning | disk removed non-write protected disk inserted, prior to access | write protected disk inserted | no change, write protected disk in drive | no change, non-write protected disk in drive |
| --- | --- | --- | --- | --- |
| Changeline | 1 | 1 | 0 | 0 |
| Write Protect | 0 | 1 | 1 | 0 |

Chart Assuming that a High-Logic State (i.e., "1") Changeline Signal indicates an Active Changeline and that the Write Protect Signal Defaults to a Write Protect Status where a Low-Logic State (i.e., "0") indicates Non-Write Protect.

Having described the functionality of changeline signals and write protect signals, the utilization of these signals in a preferred embodiment of the present invention will now be described in detail.

Figure 2:
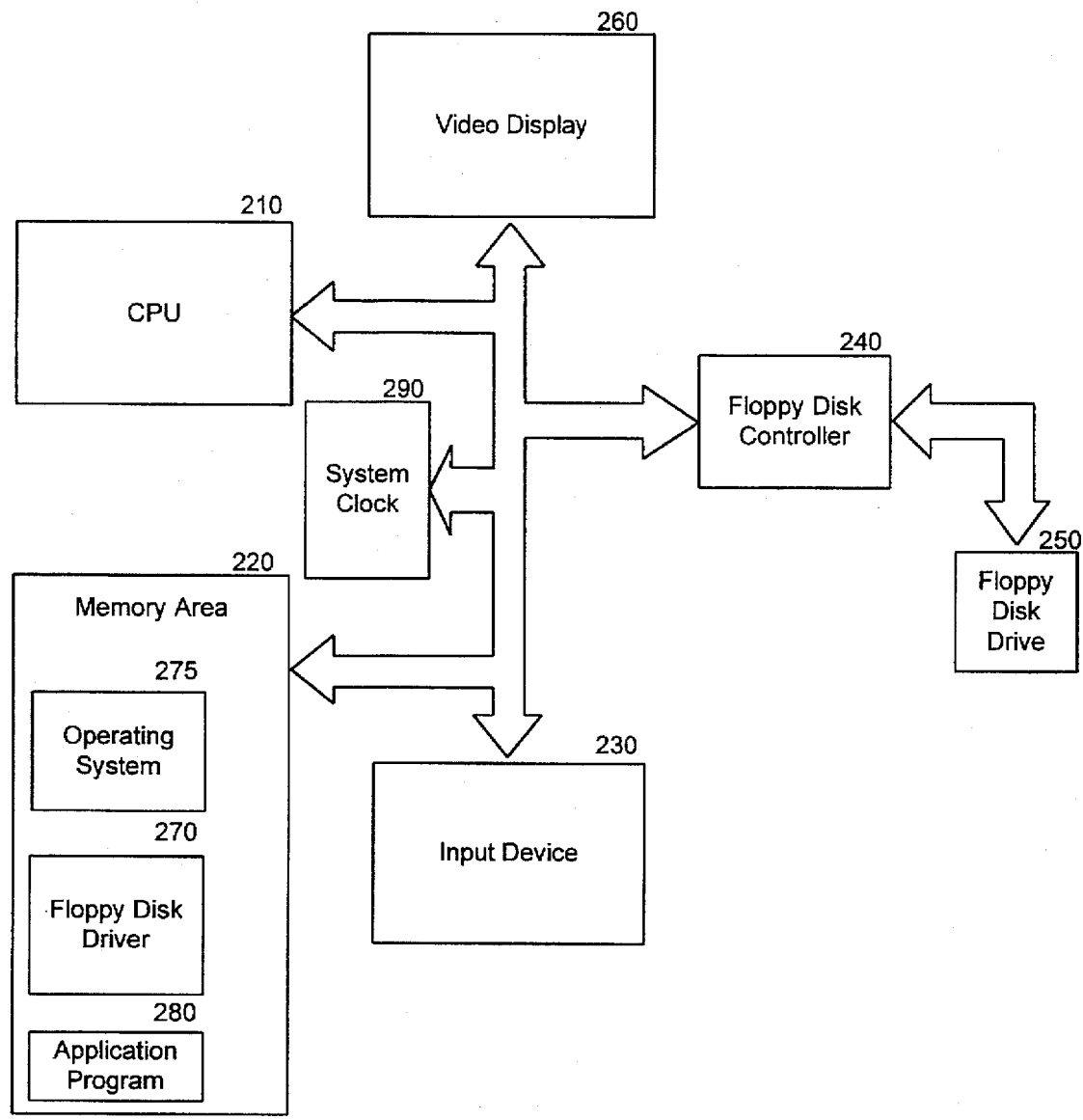
FIG. 2 illustrates a personal computer for practicing the preferred embodiment of the present invention.

FIG. 2 illustrates a personal computer system for practicing the preferred embodiment of the present invention. This computer system features a central processing unit 210, a memory area 220, an input device 230, a floppy disk controller 240, a floppy disk drive 250, a video display 260, and a system clock 290. These components are interconnected as shown. The main memory area 220 contains a floppy disk driver 270, an operating system 275, and an application program 280. The processing steps explained below with reference to FIGS. 3–6 are performed by the floppy disk driver 270. However, those skilled in the art will appreciate that these processing steps could be performed by other entities (e.g., the application program) without departing from the spirit and the scope of the claimed invention.

Figure 3:
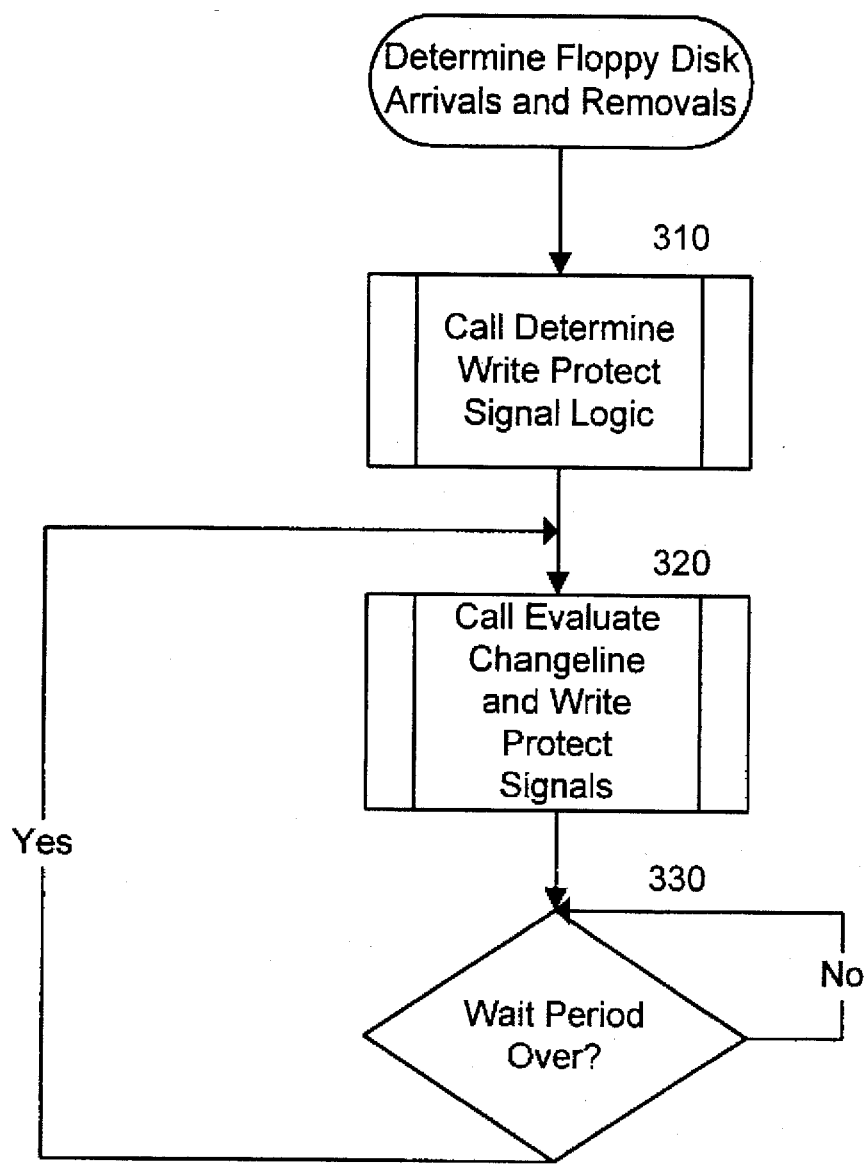
FIG. 3 is a flow diagram of the steps for determining floppy disk insertions and removals in the preferred embodiment of the present invention.

FIG. 3 is a flow diagram of the steps for determining floppy disk insertions and removals in the preferred embodiment of the present invention. The purpose of this flowchart is to determine the write protect signal logic (i.e., whether the write protect signal defaults to a write protect state or a non-write protect state). Upon determining the write protect signal logic, the flow diagram periodically evaluates the changeline and write protect signals to determine insertions and removals of disks to/from the floppy disk drive. The Determine Floppy Disk Arrivals and Removals Routine begins by calling a Determine Write Protect Signal Logic Routine (step 310).

Figure 4:
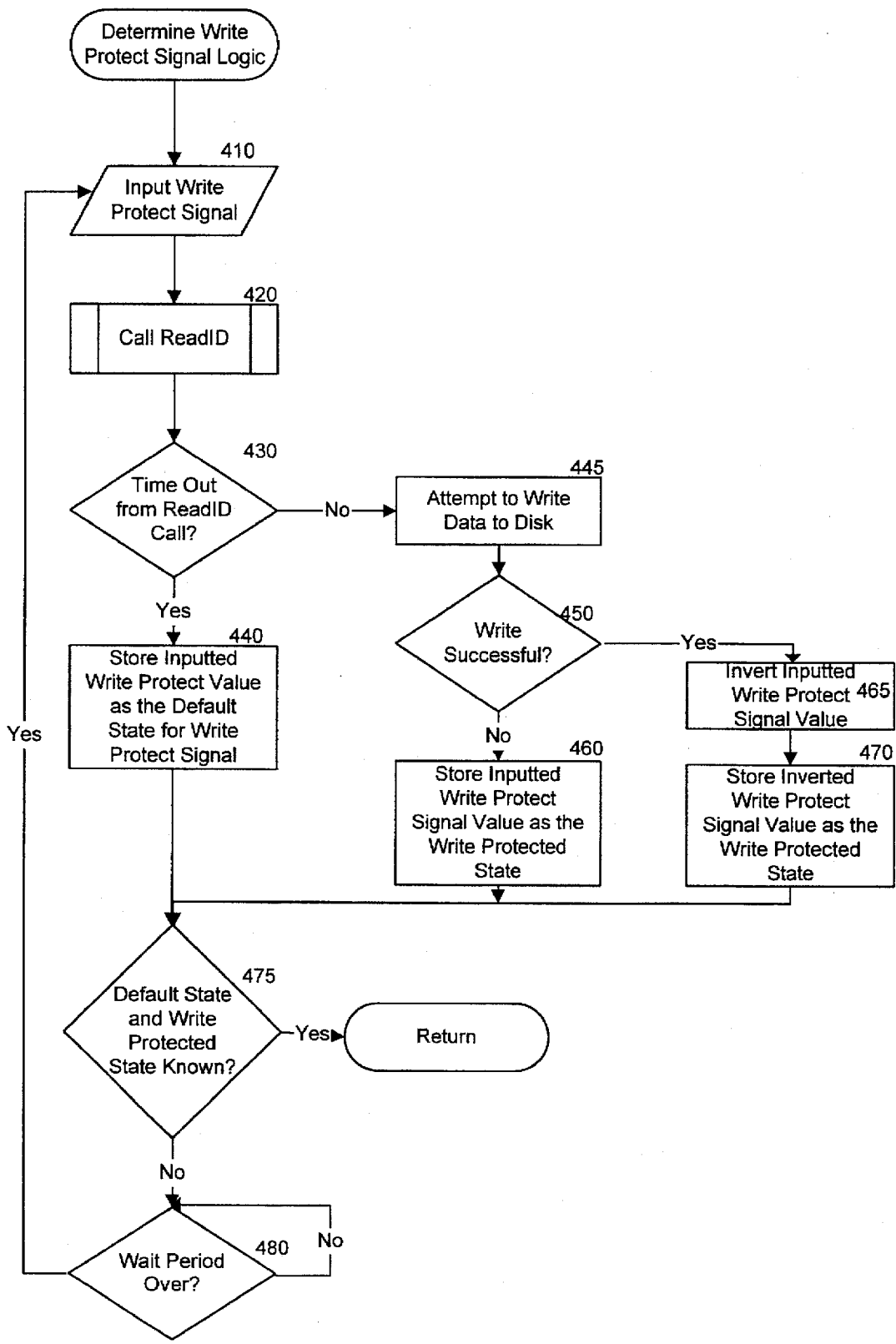
FIG. 4 is a flow diagram of the steps for determining the write protect signal's logic in the embodiment of the present invention.

FIG. 4 is a flow diagram of the steps for determining the write protect signal's logic in the preferred embodiment of the present invention. The purpose of this flow diagram is to determine whether the write protect signal defaults to a write protect status or a non-write protect status. The routine begins processing by inputting a current value of the write protect signal (step 410). The routine continues by issuing a ReadID call to access the disk drive (step 420). This ReadID call references a ReadID function in the floppy disk controller. In brief, this function returns positioning information to the driver. The precise data returned from the ReadID function is not material to the present invention as the present invention does not utilize the ReadID function in its designed manner. Instead, and as explained in more detail in the parent application, the routine uses the ReadID function to quickly determine whether the floppy disk drive contains a floppy disk. In order to quickly determine the disk's presence or absence, the routine, prior to issuing the ReadID call, loads a time-out counter with a predetermined value. This time-out counter is used to terminate the ReadID request when the controller does not complete the request within the predetermined amount of time. More specifically, the time-out counter is decremented with each cycle of the system clock 290. When the counter is decremented to zero, "times-out," before the controller completes the processing of the ReadID function, the Determine Write Protect Signal Logic Routine automatically recaptures processing control. On the other hand, when the ReadID request does not time-out, the routine regains processing control via an interrupt. The controller 240 generates this interrupt to inform the central processing unit that the controller has completed the disk access request. In turn, the central processing unit relays the interrupt to the routine. This interrupt informs the routine that the controller was able to process the ReadID request, and thus signifies that a disk is present in the drive. When the controller does not return an interrupt within the time specified by the time-out counter, the routine stores the inputted write protect value as the default state of the write protect signal (step 430, YES Pathway, and step 440). Conversely, when the routine receives an interrupt in response to the ReadID call, the routine attempts to write data to the disk (step 430, NO Pathway, and step 445).

When the attempt to write data onto the disk is successful, the routine inverts the inputted write protect signal value and stores the inverted write protect signal value as the write protected state of the write protect signal (step 450, YES Pathway, and steps 465 and 470). When the attempt to write data onto the disk is not successful, the routine stores the inputted write protect signal value as the write protected state of the write protect signal (step 450, NO Pathway, and step 460).

At this point, the routine determines whether it knows the default state and the write protected state of the write protect signal (step 475). When both of these states are not known, the routine waits for a predetermined amount of time before re-inputting the write protect signal and repeating the above-described steps (step 475, NO Pathway, and step 480). Once the default state and the write protected state of the write protect signal is known, the routine returns processing control to the Determine Floppy Disk Arrivals and Removals Routine of FIG. 3.

The Determine Floppy Disk Arrivals and Removals Routine continues processing by periodically calling the Evaluate Changeline and Write Protect Signals Routine to determine when floppy disks are removed or inserted into the floppy disk drive (steps 320 and 330). In the preferred embodiment of the present invention, the wait period described by step 330 is typically two seconds as this is generally considered to be the minimum amount .of time necessary to exchange floppy disks from the floppy disk drive.

Figure 5:
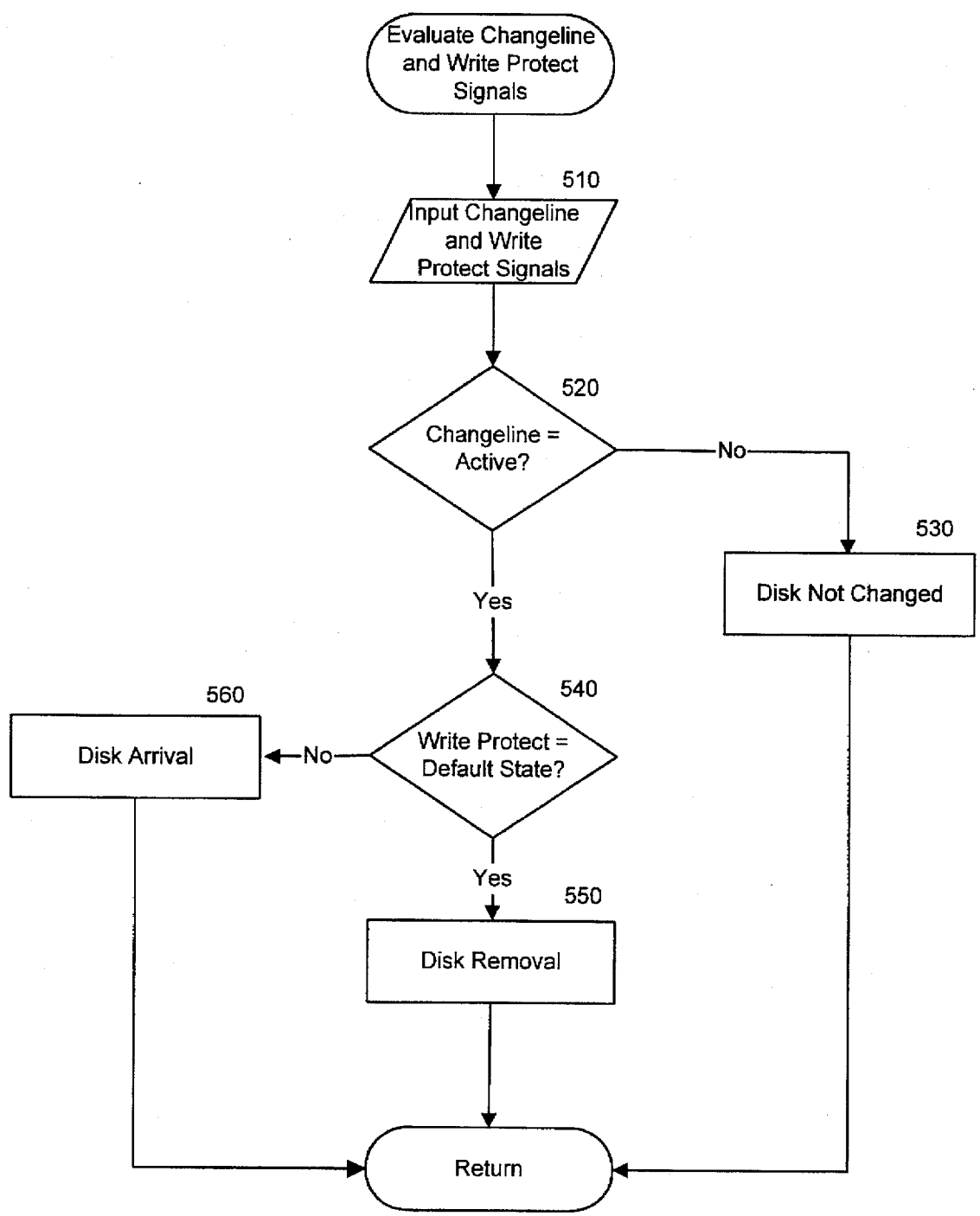
FIG. 5 is a flow diagram of the steps for evaluating changeline and write protect signals in the preferred embodiment of the present invention.

FIG. 5 is a flow diagram of the steps for evaluating changeline and write protect signals in the preferred embodiment of the present invention. The purpose of this routine is to determine whether an activated changeline represents a removal or an exchange of a floppy disk from the floppy disk drive. The routine begins processing by inputting the changeline and write protect signals (step 510). When the changeline is inactive, the routine determines that the disk had not been changed (step 520, NO Pathway, and step 530). When the changeline is active, the routine evaluates the write protect signal (step 520, YES Pathway, and step 540). When the write protect signal is in the default state, the present invention determines that the disk has been removed (step 540, YES Pathway, and step 550). When the write protect signal is not in the default state, the routine determines that the activated changeline represents a disk insertion (e.g., a removal and an insertion of a disk) (step 540, NO Pathway, and step 560). In the preferred embodiment of the present invention, when the routine determines that a disk has been removed (step 550) or that a disk has been inserted (step 560), the present invention communicates this event to the operating system 275. The operating system then informs the application program 280 of the event. As the Evaluate Changeline and Write Protect Signals Routine is called approximately every two seconds, the preferred embodiment utilizes a semaphore to ensure that the disk insertion message and the disk removed message are not sent repetitively (e.g., that two disk insertion messages or two disk removal messages are not sent consecutively). In the above-described manner, the present invention quickly and easily determines insertions and removals of floppy disks from a floppy disk drive. As the technique employed by the present invention does not require powering the floppy disk drive motor, the present invention consumes less power than conventional systems. By consuming less power, the present invention facilitates the development of power management timing strategies and should prolong the lifetimes of the floppy disk drive's components. As such, the present invention represents a substantial improvement over conventional systems.

The detailed discussion provided above represents only a preferred embodiment of the present invention. The above description will enable those skilled in the art to make various modifications to the preferred embodiment that do not depart from the spirit and the scope of the claimed invention. For example, those skilled in the art will appreciate that one could monitor for transitions of the write protect signal to determine when floppy disks of the non-default type are inserted or removed from the floppy disk drive. By monitoring for such transitions, it would not be necessary to evaluate the status of the changeline. Accordingly, the present invention encompasses all such modifications that read on the appended claims and equivalents thereof.

We claim:

1. In a computer system having a floppy disk drive for selectively holding a floppy disk, the floppy disk drive having a switch coupled to a changeline signal and a write protect signal, the changeline signal having an active state that indicates that the switch has been opened since a resetting of the changeline and an inactive state that indicates that the switch has not been opened since the resetting of the changeline, the write protect signal having a first state that indicates that the floppy disk is write protected and a second state that indicates that the floppy disk is not write protected, the write signal further having a default state when the floppy disk is not in the floppy disk drive, a method for determining when a floppy disk of a predetermined type is inserted into the floppy disk drive, the method comprising the steps of:

determining whether the default state of the write protect signal is equal to the first or the second state of the write protect signal; and after the step of determining whether the default state of the write protect signal is equal to the first or the second state of the write protect signal, determining that the floppy disk of the predetermined type is not inserted into the floppy disk drive when the changeline is in the active state and the write protect signal is in the default state.

2. The method of claim 1, further comprising the step of:

while the changeline is in the active state and that the write protect signal is in the default state, discerning when the write protect signal is no longer in the default state, and upon discerning that the write protect signal is no longer in the default state, determining that the floppy disk of the predetermined type has been inserted into the floppy disk drive.

3. The method of claim 2, further comprising the steps of:

after the step of determining that the floppy disk of the predetermined type has been inserted into the floppy disk drive, placing the changeline in the inactive state by accessing the floppy the disk of the predetermined type; and after the step of placing the changeline in the inactive state, determining when the changeline is returned to the active state, and evaluating the write protect signal to determine whether the disk of the predetermined type has been removed from the floppy disk drive.

4. The method of claim 3 wherein the step of evaluating the write protect signal to determine whether the disk of the predetermined type has been removed from the floppy disk drive comprises the step of:

determining that the disk of the predetermined type has been removed from the floppy disk drive when the evaluated write protect signal is in the default state.

5. The method of claim 3 wherein the step of evaluating the write protect signal to determine whether the disk of the predetermined type has been removed from the floppy disk drive comprises the step of:

determining that the disk of the predetermined type has been removed from the floppy disk drive and that a second disk of the predetermined type has been inserted into the floppy disk drive when the evaluated write protect signal is the non-default state.

6. The method of claim 1 wherein the step of determining whether the default state of the write protect signal is equal to the first or the second state of the write protect signal, comprises the steps of:

accessing the floppy disk drive to determine whether the floppy disk drive is empty;

when the floppy disk drive is not empty,
        reading a first value of the write protect signal,
        attempting to write to the floppy disk drive,
        when the step of attempting to write to the floppy disk drive is successful, storing the first value as a non-write protected value, and
    when the step of attempting to write to the floppy disk drive is not successful, storing the first value as a write protected value;

when the floppy disk drive is empty,
        reading a second value of the write protect signal, and storing the second value as a default value;

when the default value is equivalent to the write protected value, determining that the default state of the write protect signal is equal to the first state of the write protect signal; and when the default value is equivalent to the non-write protected value, determining that the default state of the write protect signal is equal to the second state of the write protect signal.

7. In a computer system having a first signal and a second signal, the first signal being generated to indicate a possibility that a component has been removed from the computer system and the second signal having a default value when the component has been removed from the computer system, a method for determining when the component is inserted into the computer system, the method comprising the steps of:

while the first signal is generated, determining whether the second signal has the default value; and after discerning that the second signal has the default value while the first signal is generated, monitoring the second signal to discern when the second signal is no longer in the default state, and upon discerning that the second signal is not in the default state, determining that the component has been inserted into the computer system.

8. The method of claim 7, further comprising the steps of:

after determining that the component has been inserted into the computer system, monitoring the second signal to discern when the second signal has returned to the default state, and upon determining that the second signal has returned to the default state, determining that the component has been removed from the computer system.

9. In a computer system having a disk drive for selectively containing a disk, the disk drive providing a write protect signal having a default state when the disk drive is empty and having a non-default state when a disk of a predetermined type is contained within the drive, the disk drive further providing a changeline signal having an active state and an inactive state, an apparatus for determining whether the disk of the predetermined type is inserted into the disk drive, the apparatus comprising:

means for determining when the changeline is in an active state;

means for determining when the write protect signal is in the default state; and while the changeline is in the active state, means for monitoring the write protect signal for a change from the default state to the non-default state so as to identify an insertion of the disk of the predetermined type into the disk drive.

10. The apparatus of claim 9, further comprising:

means for monitoring the write protect signal for a change from the non-default state to the default state so as to identify a removal of the disk of the predetermined type from the disk drive.

11. The apparatus of claim 9, further comprising:

means for monitoring the changeline to determine a transition from the inactive state to the active state; and after determining that the changeline has made the transition from the inactive state to the active state, means for detecting when the write protect signal is in the default state so as to identify a removal of the disk of the predetermined type from the disk drive.

12. The apparatus of claim 9, further comprising:

means for monitoring the changeline to determine a transition from the inactive state to the active state; and after determining that the changeline has made the transition from the inactive state to the active state, means for detecting when the write protect signal is in the non-default state so as to identify an insertion of the disk of the predetermined type into the disk drive.

13. The apparatus of claim 9 wherein the disk of the predetermined type is a disk of a write protected type.

14. The apparatus of claim 9 wherein the disk of the predetermined type is a disk of a non-write protected type.

15. An apparatus for detecting whether a component of a predetermined type is present in a computer system, the computer system employing a first signal having a first and a second state, the first state indicating a certainty of a presence of the component of the predetermined type and the second state indicating an uncertainty of a presence of the component of the predetermined type, the computer system employing a second signal having a default state and a non-default state, the second signal changing from the default state to the non-default state when the component of the predetermined type is inserted into the computer system, the apparatus comprising:

a polling device that periodically determines current states of the first signal and the second signal; and an evaluator to discern that the component of the predetermined type has been exchanged with a second component of the predetermined type when the polling device determines that the second signal is in the non-default state after determining that the first signal has changed from the first state to the second state.

16. The apparatus of claim 15 wherein the component of a predetermined type is a write protected disk.

17. The apparatus of claim 15 wherein the component of a predetermined type is a non-write protected disk.

18. An apparatus comprising:

a floppy disk drive providing a changeline signal having an active state and an inactive state, the floppy disk drive also providing a write protect signal having a default state when the floppy disk drive is empty and a non-default state when a floppy disk of a predetermined type is contained within the floppy disk drive;

a floppy disk drive controller that receives the changeline signal and the write protect signal from the floppy disk drive;

an evaluator to read, from the floppy disk controller, current states of the changeline and the write protect signals; and a floppy disk insertion determining device that discerns that the floppy disk of the predetermined type has been inserted into the floppy disk drive when the evaluator reads that the current state of the changeline is in the active state and the current state of the write protect signal is in the non-default state.

19. The apparatus of claim 18, further comprising:

a floppy disk removal determining device that discerns that the floppy disk of the predetermined type has been removed from the floppy disk drive when the evaluator reads that the current state of the changeline is in the active state and the current state of the write protect signal is in the default state.

20. In a computer system having a floppy disk drive for selectiveley holding a floppy disk, the floppy disk drive having a switch coupled to a changeline signal and a write protect signal, the changeline signal having an active state that indicates that the switch has been opened since a resetting of the changeline and an inactive state that indicates that the switch has not been opened since the resetting of the changeline, the write protect signal having a first state that indicates that the floppy disk is write protected and a second state that indicates that the floppy disk is not write protected, the write signal further having a default state when the floppy disk is not in the floppy disk drive, a computer-readable medium holding computer-executable instructions for performing a method for determining when a floppy disk of a predetermined type is inserted into the floppy disk drive, the method comprising the steps of:

determining whether the default state of the write protect signal is equal to the first or the second state of the write protect signal; and after the step of determining whether the default state of the write protect signal is equal to the first or the second state of the write protect signal, determining that the floppy disk of the predetermined type is not inserted into the floppy disk drive when the changeline is in the active state and the write protect signal is in the default state.

21. The computer-readable medium of claim 20 wherein the method further comprises the step of:

while the changeline is in the active state and that the write protect signal is in the default state, discerning when the write protect signal is no longer in the default state, and upon discerning that the write protect signal is no longer in the default state, determining that the floppy disk of the predetermined type has been inserted into the floppy disk drive.

22. The computer-readable medium of claim 21 wherein the method further comprises the steps of:

after the step of determining that the floppy disk of the predetermined type has been inserted into the floppy disk drive, placing the changeline in the inactive state by accessing the floppy the disk of the predetermined type; and after the step of placing the changeline in the inactive state, determining when the changeline is returned to the active state, and evaluating the write protect signal to determine whether the disk of the predetermined type has been removed from the floppy disk drive.

23. The computer-readable medium of claim 22 wherein the step of evaluating the write protect signal to determine whether the disk of the predetermined type has been removed from the floppy disk drive comprises the step of:

determining that the disk of the predetermined type has been removed from the floppy disk drive when the evaluated write protect signal is in the default state.

24. The computer-readable medium of claim 22 wherein the step of evaluating the write protect signal to determine whether the disk of the predetermined type has been removed from the floppy disk drive comprises the step of:

determining that the disk of the predetermined type has been removed from the floppy disk drive and that a second disk of the predetermined type has been inserted into the floppy disk drive when the evaluated write protect signal is the non-default state.

25. The computer-readable medium of claim 20 wherein the step of determining whether the default state of the write protect signal is equal to the first or the second state of the write protect signal, comprises the steps of:

accessing the floppy disk drive to determine whether the floppy disk drive is empty;

when the floppy disk drive is not empty, reading a first value of the write protect signal, attempting to write to the floppy disk drive, when the step of attempting to write to the floppy disk drive is successful, storing the first value as a non-write protected value, and when the step of attempting to write to the floppy disk drive is not successful, storing the first value as a write protected value;

when the floppy disk drive is empty, reading a second value of the write protect signal, and storing the second value as a default value;

when the default value is equivalent to the write protected value, determining that the default state of the write protect signal is equal to the first state of the write protect signal; and when the default value is equivalent to the non-write protected value, determining that the default state of the write protect signal is equal to the second state of the write protect signal.

26. In a computer system having a first signal and a second signal, the first signal being generated to indicate a possibility that a component has been removed from the computer system and the second signal having a default value when the component has been removed from the computer system, a computer-readable medium holding computer-executable instructions for performing a method for determining when the component is inserted into the computer system, the method comprising the steps of:

while the first signal is generated, determining whether the second signal has the default value; and after discerning that the second signal has the default value while the first signal is generated, monitoring the second signal to discern when the second signal is no longer in the default state, and upon discerning that the second signal is not in the default state, determining that the component has been inserted into the computer system.

27. The computer-readable medium of claim 26 wherein the method further comprises the steps of:

after determining that the component has been inserted into the computer system, monitoring the second signal to discern when the second signal has returned to the default state, and upon determining that the second signal has returned to the default state, determining that the component has been removed from the computer system.

* * * * *